United States Patent [19]

Gorog

[11] 4,004,078
[45] Jan. 18, 1977

[54] OPTICAL COMMUNICATION AND DISPLAY SYSTEM

[75] Inventor: Istvan Gorog, Princeton, N.J.

[73] Assignee: RCA Corporation, New York, N.Y.

[22] Filed: Jan. 24, 1974

[21] Appl. No.: 436,038

[52] U.S. Cl. .................. 358/83; 250/199; 358/142

[51] Int. Cl.[2] .......................... H04B 9/00

[58] Field of Search ............... 178/6,7.6; 250/199

[56] References Cited

UNITED STATES PATENTS

| | | | |
|---|---|---|---|
| 1,984,673 | 12/1934 | DuMont | 250/199 |
| 3,433,958 | 3/1969 | Lenzo | 250/199 |
| 3,435,229 | 3/1969 | Buhrer | 250/199 |
| 3,562,422 | 2/1971 | McMann | 250/199 |
| 3,569,616 | 3/1971 | Baker | 250/199 |
| 3,624,402 | 11/1971 | Thaler | 250/199 |
| 3,699,478 | 10/1972 | Pinnow | 250/199 |
| 3,703,687 | 11/1972 | Maydan | 250/199 |
| 3,717,769 | 2/1973 | Hubbard | 250/199 |
| 3,721,756 | 3/1973 | Baker | 250/199 |
| 3,740,560 | 6/1973 | Wentz | 250/199 |
| 3,755,676 | 8/1973 | Kinsel | 250/199 |
| 3,875,400 | 4/1975 | Pao et al. | 250/199 |
| 3,911,206 | 10/1975 | Nasu | 178/6 |

*Primary Examiner*—Benedict V. Safourek
*Assistant Examiner*—Michael A. Masinick
*Attorney, Agent, or Firm*—H. Christoffersen; Samuel Cohen; George J. Seligsohn

[57] ABSTRACT

The light wave energy of a scanning, intensity-modulated light beam used to provide an optical display or recording of a given scene at a receiving station is the same light wave energy initially employed to optically communicate video information pertaining to this given scene between a transmitting station and the receiving station.

3 Claims, 5 Drawing Figures

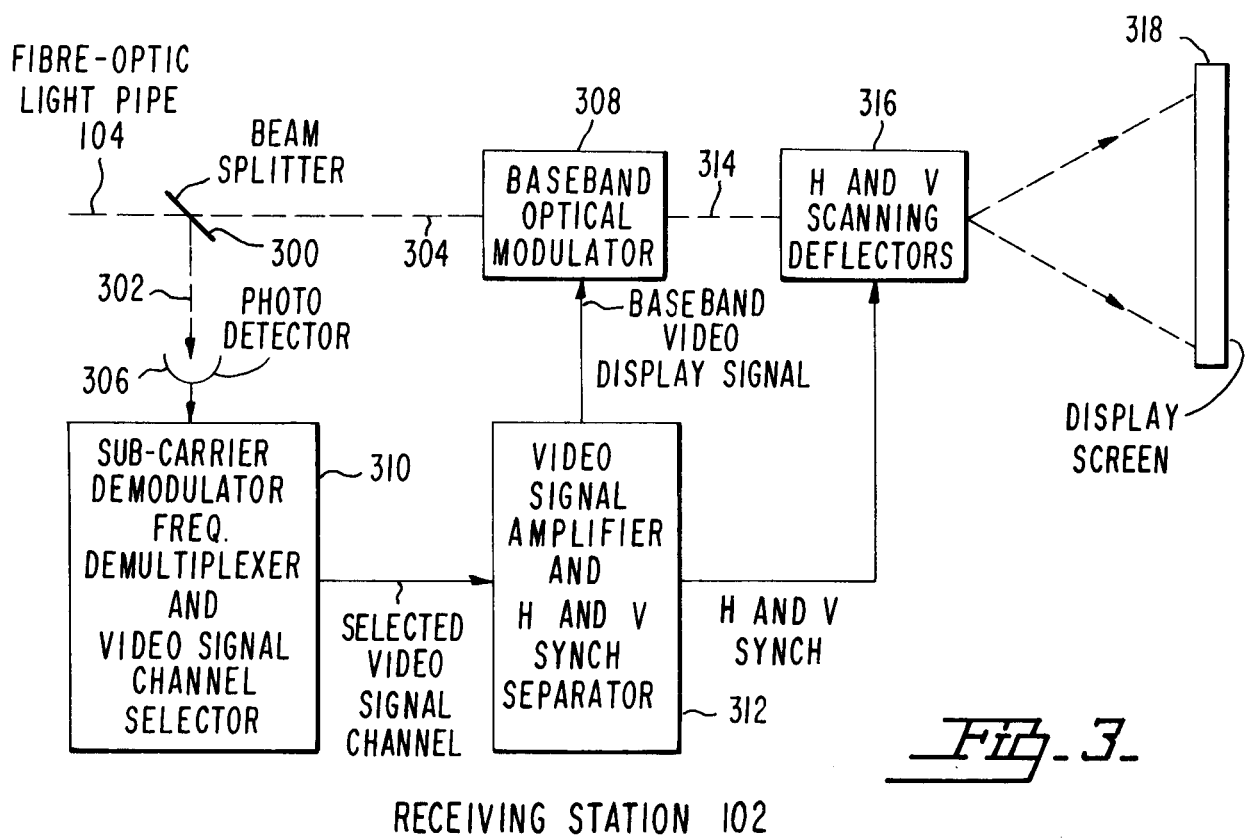
Fig. 3. RECEIVING STATION 102
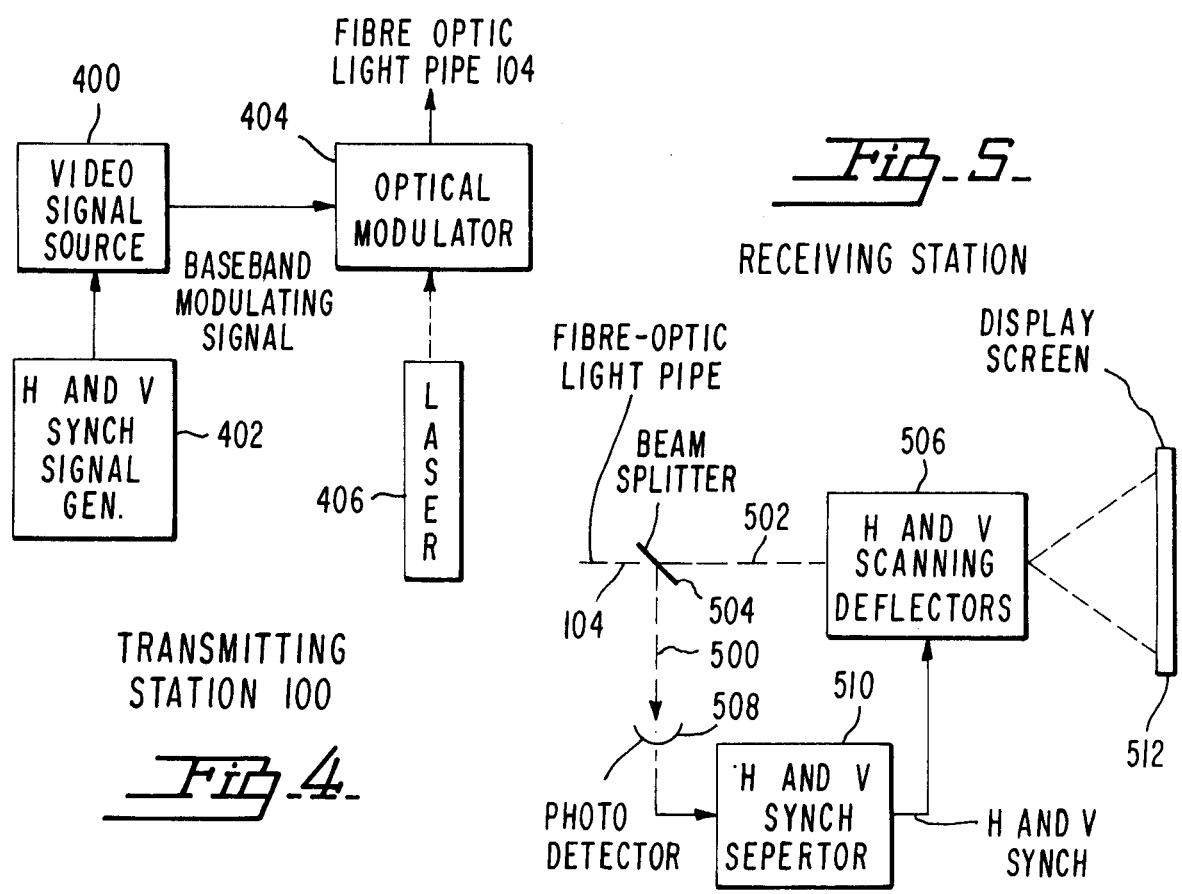
Fig. 4. TRANSMITTING STATION 100
Fig. 5. RECEIVING STATION

OPTICAL COMMUNICATION AND DISPLAY SYSTEM

This invention relates to an optical communication and display system and, more particularly, to such a system for optically displaying or recording at a receiving station a video signal manifesting a given scene which has been optically communicated to the receiving station from a remote transmitting station.

Optical display and recording systems have already been developed employing a scanning light beam from a laser in which the light beam is intensity-modulated in accordance with a video signal manifesting a given scene. As is known, intensity-modulation of a light beam may be achieved by means of an electro-optic crystal and scanning of the light beam may be achieved by light deflecting means including one or more properly-synchronized rotating mirrors, acousto-optic diffraction cells, etc. In the case of a recording system, scanning of the light beam may be in only one of two orthogonal directions (such as the horizontal direction) and the light beam may be focused on a recording medium which is slowly moving in the other of the two orthogonal directions (such as the vertical direction). In the case of a display, the deflecting means normally scans the light beam repeatedly in both orthogonal directions, in a manner similar to the scanning of the electron beam in a conventional television display.

In an optical display, the scanning light beam is focused on a display screen. There are at least four different known approaches for providing an optical display on a display screen. The most straight forward of these four display approaches is a direct laser display. In this first approach, the scanning intensity-modulated laser light beam is projected onto a viewing screen of a type similar to those currently used in theaters, with slide projectors, etc. Thus, with this first approach, the display light reaching the observer eye is the laser light itself. Since laser light is both monochromatic and coherent, the displayed image will be in various shades of the single color of the laser light itself and, due to coherence, may include spurious interference patterns which appear as unwanted speckle noise in the displayed image.

A second known approach is a laser display with a photoluminescent screen. In this case, the scanning, intensity-modulated laser light beam is projected onto a viewing screen that is coated with a photoluminescent material. The laser light excites the photoluminescent material which then decays radiatively. The display light reaching the observer's eye is the light emitted by the screen coating. This arrangement has an energy efficiency (display light/laser light) less than unity, but it has the advantage over the first approach, described above, that it allows color conversion and eliminates the speckle noise. Further, the second approach permits the use of shadow-mask techniques, similar to those employed in color television, to provide a color display by using a plurality of laser beams (such as one for each primary color) which illuminates a screen having a mosaic of different color phosphors which are illuminated by the laser beams through the apertures of a shadow mask which is registered with the phosphor.

The third known approach is a laser display with an active screen. In this case, the scanned intensity-modulated laser light beam is projected onto a large screen that has optical gain. Suitable screens would be, for example, an electroluminescent and photoconductor combination light amplifier screen, a large area photoconductor-controlled liquid-crystal screen, or a large area screen employing proximity-focused photoemitter-phosphor image intensifiers. With this approach, the display light reaching the observer's eye is, dependent on the type of screen, either reflected ambient light, or electronically generated (electroluminescent or catholuminescent) light. Such screens allow color conversion, eliminate speckle noise and greatly reduce the required laser light beam power with respect to the first and second approaches, discussed above.

A fourth known approach is a laser-controlled light valve display. In this case, the scanned, intensity-modulated laser light beam is projected onto an optically addressable light valve that controls the light from an incoherent projection lamp and a light valve image is projected onto a simple viewing screen of a type similar to those currently used in theaters with slide projectors, etc. Suitable valve structures would be, for example, a small area photoconductor-controlled liquid crystal screen, a photoconductor-controlled surface deformable media, a photoconductor or photoemitter controlled electrooptic crystal.

Besides optical display and optical recording systems, there has also been developed optical communication systems in which a beam of laser light, which has been modulated in some given form by an information signal, is coupled between a transmitting station and one or more receiving stations. With the recent development of low-loss fibre optic light pipes, which may serve as a transmission element between the transmitting station and each of the receiving stations, the practicality of such optical communications systems has increased.

From a practical point of view, in many optical display systems employing a laser, such as the four types described above, it is very desirable to place the laser source at a location remote from the display. More particularly, the first and second laser display approaches, described above, both require high power (approximately one watt or greater), visible lasers. Such lasers are bulky, they require bulky power supplies and they require means of cooling (typically flowing water cooling). From the point of view of either consumer applications or from the point of view of special purpose applications (e.g. cockpit displays), it is much more convenient to locate the high power laser in some appropriate utility area and have only the scanning and projection means in the display area, than to have the bulky source in the display area too. While the third and fourth laser display approaches, described above, require lower power lasers than the first and second approaches, they are especially suitable for distributing displayable information from a transmitting station located at a central location to one or more receiving stations remote therefrom over transmission means, such as a fibre-optic light pipe, for example. The distributed information may, if desired, include a plurality of separate multiplexed information channels. In this case, each of the receiving stations are provided with means for selectively displaying any one of the multiplexed information channels.

Since in the type of system just discussed, (1) light wave energy, modulated in some given form by a video signal manifesting both a given scene and scanning sync signal, is received by any receiving station, and (2) a receiving station incorporates a display means which makes use of scanned beams of light wave energy which then is intensity-modulated in accordance with the video information manifested by the given scene, it would, therefore, be most desirable to employ the same light wave energy received by the receiving station as the wave energy of the light beam for the display. Furthermore, it also would be desirable to obtain the intensity modulation of the light beam from the given form of modulation of the received light wave energy and, in addition, separate the scanning sync signals from the received light wave energy and apply them to the deflecting means of the receiving station to synchronize the scan thereof. The present invention is directed to a system which achieves these goals for either an optical display system or an optical recording system.

These and other features and advantages of the present invention will become more apparent from the following detailed description taken together with the accompanying drawing, in which:

FIG. 3 is a first embodiment of the receiving station of FIG. 1, which is employed with the transmitting station embodiment of FIG. 2;

FIG. 4 is a second embodiment of the transmitting station of FIG. 1, and

FIG. 5 is a second embodiment of a receiving station of FIG. 1, which is used with the second embodiment of the transmitting station shown in FIG. 4.

Figure 1:
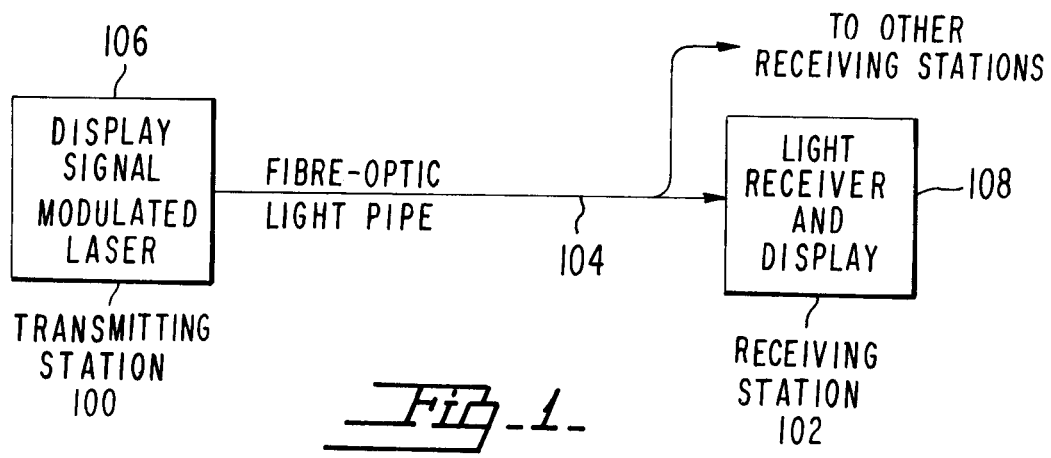
FIG. 1 is a block diagram of an optical communication system comprising a single transmitting station, incorporating a display-signal modulated laser, coupled by means of a fibre-optic light pipe to one or more receiving stations, each of which incorporates a light receiver and display.

As shown in FIG. 1, a single transmitting station 100 is coupled to one or more receiving stations 102 by a fibre-optic light pipe 104. The single transmitting station 100 is constituted of a display-signal modulated laser 106, which may have the form shown in either FIG. 2 or FIG. 4. Each receiving station 102 is constituted of a light receiver and display 108 which may have the form shown in either FIG. 3 or FIG. 5.

Figure 2:
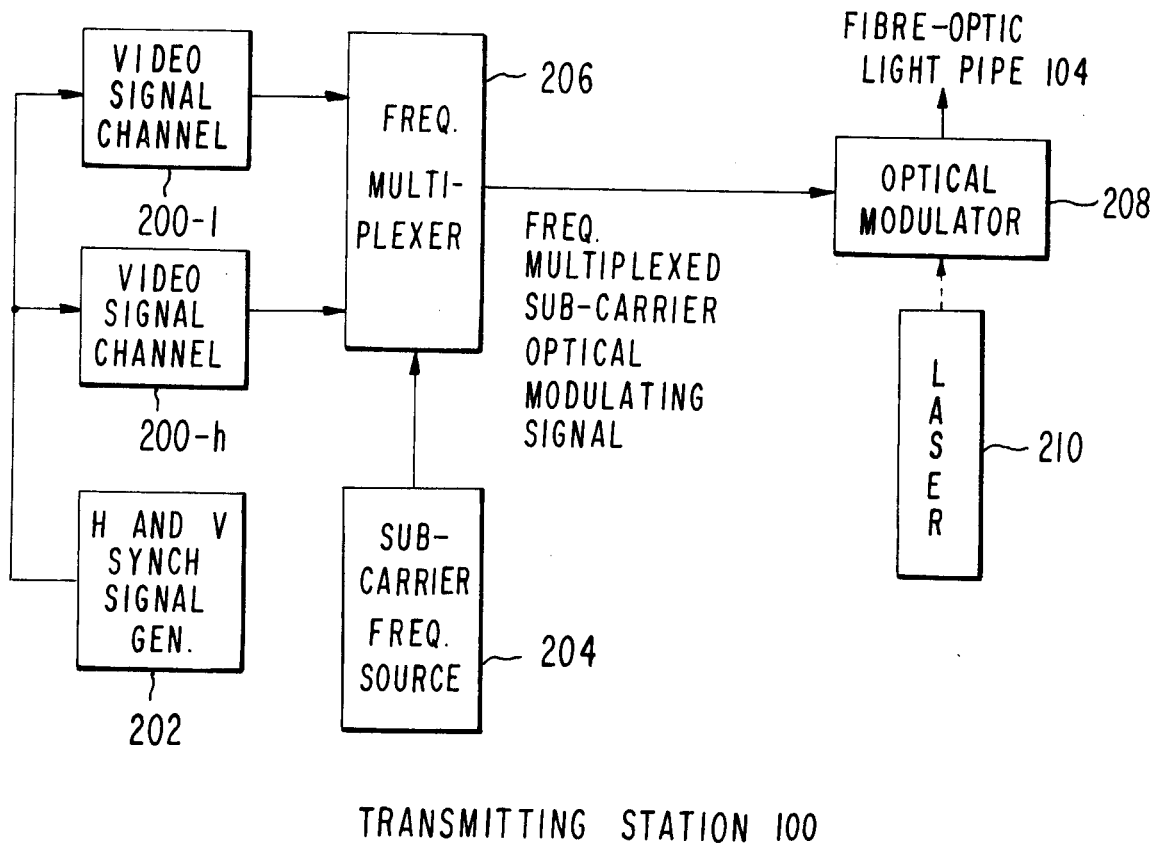
FIG. 2 is a first embodiment of the transmitting station of FIG. 1.

Referring now to the transmitting station 100 of FIG. 2, there is shown a plurality of video signal channels 200-1 . . . 200-n. Each of these channels may incorporate a separate television camera, each of which has its horizontal and vertical scan synchronized by sync signals from H and V sync signal generator 202. Such a television camera may be either a black and white television camera producing an output which has only luminance information of the scene viewed by that television camera or a color television camera producing an output which has both luminance and chrominance information of the scene viewed by that television camera. On the other hand, each video signal channel 200-1 . . . 200-n may constitute a recorded video tape or a television relay station. In these latter cases, generator 202 may be eliminated, since horizontal and vertical sync signals are already present. In any case, the output from each of video signal channels 200-1 . . . 200-n is a video signal which manifests both the video information of the given scene and the horizontal and vertical sync signals which are combined in a manner well known in the television art.

All of the individual video signals from video generator 200-1 . . . 200-n along with a sub-carrier frequency signal from source 204, are applied as inputs to frequency multiplexer 206. As is known in the frequency multiplexing art, frequency multiplexer 206 includes oscillators and upconverters for placing each video signal in its own frequency band. Usually, each frequency band is contiguous with the preceding frequency band. Frequency multiplexer 206 further includes a modulator for modulating (in some known form; i.e., A.M., F.M., etc., as the case may be) the sub-carrier frequency from source 204 with all the frequency-multiplexed video signals from channels 200-1 . . . 200-n. Thus, the output from frequency multiplexer 206 is a wide bandwidth signal. It is essential that the lowest frequency component of this wide band output from frequency multiplexer 206 have a frequency which is higher than the highest frequency component of any video signal itself. For example, if each video signal has a bandwidth of 6 MHz, there are a total of 10 video signal channels, the sub-carrier frequency is 100 MHz and is amplitude-modulated by all 10 frequency-multiplexed video signals, the bandwidth of the lower sideband of the ten frequency-multiplexed video signals would extend from 40 MHz to 100 MHz and the upper sideband thereof would extend from 100 MHz to 160 MHz. In the case of this example, the lowest frequency component of the output from frequency multiplexer 206, 40 MHz, is significantly higher than the highest frequency component, 6 MHz, of any video signal itself.

As shown in FIG. 2, the output from frequency multiplexer 200 is applied as an optical modulating signal to optical modulator 208, which has the output from laser 210 applied as the carrier input thereto.

Alternatively, the optical modulating signal applied as an input to optical modulator 208 may be a group of separate video-modulated sub-carriers within a predetermined frequency band (e.g., all the television channels within the VHF band picked up by a VHF antenna). The output from optical modulator 208 is applied as an input to fibre-optic light pipe 104.

Optical modulator 208 may be an electro-optic crystal, as known in the art. For the purpose of clarity in FIG. 2, optical modulator 208 has been shown as an external modulator with respect to laser 210. However, as known in the art, optical modulators for lasers may be either external or internal. As far as the present invention is concerned, it is immaterial as to whether the modulation of the laser wave energy from laser 210 with the output signal from frequency multiplexer 206 is accomplished by an external optical modulator or an internal optical modulator. Furthermore, the particular form of the modulation of the laser wave energy from laser 210 by the output from frequency multiplexer 206 is immaterial, so long as it is known a priori. Thus, the form of the modulation of the light wave energy of laser 210 may be amplitude modulation, frequency modulation, phase modulation or any desired given combination of these, as specified in the system design. Thus, the output from optical modulator 208, which is applied as an input to fibre-optic light pipe 104, is light wave energy which has been modulated in a given form by all of the video signals from all of the video channels 200-1 . . . 200-n.

Fibre-optic light pipe 104 may be composed of either a single fibre-optic or a bundle of separate fibre-optics. In the latter case, the output from optical modulator 208 is distributed as an input to all of the fibre-optics in the bundle.

The light wave energy carried by fibre-optic light pipe 104 may all be sent to a single receiving station 102 or, as indicated in FIG. 1, it may be distributed to a plurality of similar receiving stations. A light pipe composed of a bundle of fibre-optics is particularly suitable for distributing the light wave energy to a plurality of receiving stations, with different fibre-optics of the light pipe being employed for each of the receiving stations. However, a light pipe composed of a single fibre-optic may be coupled in series to a plurality of receiving stations, employing suitable optical coupling means at each receiving station to distribute a separate portion of the light wave energy carried therein to each of the receiving stations.

Referring now to FIG. 3, there is shown the configuration of any of receiving stations 102 which operate with the single transmitting station 100 having this configuration shown in FIG. 2, discussed above. The light wave energy from fibre-optic light pipe 104, which is distributed to the particular one of the receiving stations 102 shown in FIG. 3, illuminates beam splitter 300. Beam splitter 300, which may be a partially reflecting-partially transmissive beam splitter, reflects a relatively small portion of the incident light wave energy as component 302 and transmits the remainder of the incident light wave energy as component 304. Component 302 is incident on photodetector 306 and component 304 is incident on baseband optical modulator 308. The detection of the light wave energy component 302 by photodetector 306 results in the recovery of the frequency-multiplexed sub-carrier, which constituted the optical modulating signal applied to optical modulator 208. This frequency-multiplexed sub-carrier, which appears as an electrical signal at the output of photodetector 306, is applied as an input to sub-carrier demodulator, frequency demultiplexer and video signal channel selector 310. Block 310 includes suitable detectors and down converters for removing the sub-carrier and recovering at least one video signal corresponding to any selected one of the video signals from video signal channel 200-1 . . . 200-n respectively, at baseband. Thus, block 310 may reduce either only this selected video signal channel to baseband or it may reduce video signals corresponding to all of the video signal channels to baseband, and then select only one of these baseband signals as an output. In any event, only the video signal of the selected video signal channel (which is selected by the viewer at the receiving station by means of a selector switch included as part of block 310) is applied to video signal amplifier and H and V sync separator 312. Block 312, which corresponds in all material respects with the video signal amplifier and sync separator of a standard television set, produces a separate baseband video display signal output and a horizontal and vertical sync output, as shown in FIG. 3.

Baseband optical modulator 308, which may be an electro-optic crystal, intensity-modulates the light wave energy of remainder component 304 with the baseband video display signal applied as a modulating signal thereto. Thus, the output light beam 314 from baseband optical modulator 308 is composed of the same light wave energy present in remainder component 304, which was received from fibre-optic light pipe 104. Of course, light beam 314 is distinguished from component 304 only in that light beam 314 is intensity-modulated at baseband by a selected video signal and component 304 is not. In particular, the light wave energy of component 304 and the light wave energy light beam 314 are both still modulated at the sub-carrier frequency with the wide band of frequency-multiplexed video channel sidebands. As is explained below, the presence of this wideband, high frequency modulation of the light wave energy of light beam 314 has no effect on the display.

Intensity-modulated light beam 314 is applied as an input to horizontal and vertical scanning deflectors 316, which, as explained above, comprises suitably synchronized rotating mirrors. Specifically, the horizontal scanning deflecting mirror is synchronized by the horizontal sync signal applied thereto from block 312 and the vertical scanning mirror is synchronized by the vertical sync signal applied thereto from block 312.

The scanning, intensity-modulated output light wave energy from block 316 is projected on display screen 318, as shown in FIG. 3. The display on display screen 318 may employ any of the four approaches discussed above in detail. However, the transmitting and receiving station having the configuration shown in FIGS. 2 and 3 is particularly suitable for the third and fourth approaches described above, which employ relatively low power light wave energy. Further, display screen 318 may be replaced by a moving recording medium and transport therefor, as is conventionally used in laser recorders.

In any case, the display results from the intensity modulation at baseband of the scanning light output from block 316. The fact that light wave energy projected on display screen 318 happens to be also modulated by the subcarrier sidebands, as described above, has no effect on the display. The reason for this is that the lowest frequency sideband component is sufficiently above the highest baseband frequency of the video signal beyond the resolution capability of display screen 318 or beyond the resolution capabilities of the human viewer. Thus, the fact that the projected light wave energy on display screen 318 is modulated by a wideband of frequencies distributed about the high subcarrier frequency is totally without effect on the image displayed by display screen 318.

FIG. 4 shows a configuration for a transmitting station 100 employing only a single video signal source, which remains at baseband. Specifically, the video signal source 400 produces a video signal at baseband which manifests both a given scene and horizontal and vertical synch signals, which may be obtained from H and V sync signal generator 402 coupled to video signal source 400. The output from video signal source 400 is applied as a baseband modulating signal to optical modulator 404, to thereby modulate the light wave energy from laser 406 applied as an input thereto with the baseband modulating signal. The output from modulator 404 is applied as an input to fibre-optic light pipe 104.

Receiving station 102, having the configuration shown in FIG. 5, is employed with the transmitting station of FIG. 4. Specifically, the light wave energy output from fibre-optic light pipe 104 is divided into light wave energy component 500 and remainder component 502 by beam splitter 504. Remainder component 502, which is already intensity-modulated at baseband, itself forms the light beam which is applied as an input to H and V scanning deflectors 506. However, in order to synchronize deflectors 506, the horizontal and vertical sync signals must be recovered. This is done by detecting the light wave energy component 500 by photodetector 508 and applying it as an input to synch separator 510. The H and V sync signal output from separator 510 synchronizes the scanning of deflectors 506. In the same manner as described in connection with FIG. 3, the scanning light wave energy output from deflectors 506, which is intensity modulated at baseband, is projected on display screen 512, to display the image manifested by the video signal from source 400 of FIG. 4.

The configuration of FIGS. 4 and 5, while applicable to all four display approaches, discussed above, is particularly suitable for the first and second above-described display approaches, which employ a high power laser. Further, display screen 512 may be replaced by a moving recording medium and transport therefor, as is conventionally used in laser recorders.

What is claimed is:

1. In a system of the type in which deflecting means scans a light beam applied thereto, which light beam is intensity-modulated with video information manifesting a given scene, comprising translating means coupled to said deflecting means and responsive to received light wave energy from a remotely located source applied as an input thereto which light wave energy as received is modulated in some given form with a video signal manifesting both said given scene and sync signals for synchronizing the scan of said deflecting means, said translating means including means for employing said received light wave energy as the wave energy of said light beam, obtaining said intensity modulation of said light beam from said given form of modulation of said received light wave energy, and separating said sync signals from said received light wave energy and applying them to said deflecting means to synchronize the scan thereof, the improvement:

wherein said given form of modulation comprises a subcarrier modulated by the video signal of said light wave energy, the entire bandwidth of said modulated sub-carrier being above the highest baseband frequency component of said video signal itself, and wherein said translating means comprises means including a photodetector for demodulating only a portion of said light wave energy, an electro-optic modulator having the remainder of said light wave energy applied as an input thereto, means coupled to said photodetector including a sub-carrier detector responsive to the output of said photodetector for reducing said video signal to baseband, sync separator means for removing said sync signals from said baseband video signal, said baseband video signal being applied as a modulating signal to said electro-optic modulator and said separated sync signals being applied to said deflecting means to synchronize the scan thereof, the output from said electro-optic modulator constituting said light beam applied to said deflecting means.

2. The system defined in claim 1, wherein said means including a photodetector also includes a beam splitter for splitting said portion of said light wave energy from said remainder thereof.

3. The system defined in claim 1, wherein said sub-carrier of said light wave energy is modulated by a plurality of frequency-multiplexed video channels, each of which corresponds with a separate video signal, and wherein said sub-carrier detector includes demultiplexing means for reducing any selected video signal to baseband and applying only said selected baseband video signal as said modulating signal to said electro-optic modulator.

* * * * *